United States Patent [19]

Lucas et al.

[11] 3,762,971

[45] Oct. 2, 1973

[54] THIXOTROPIC HYDRAZINE FUEL GELLED WITH CROSS-LINKED POLYACRYLIC ACID

[75] Inventors: James M. Lucas, El Dorado Hills; Eugene M. Vander Wall, Citrus Heights, both of Calif.

[73] Assignee: Aerojet-General Corporation, El Monte, Calif.

[22] Filed: Aug. 16, 1967

[21] Appl. No.: 662,271

[52] U.S. Cl. ................................. 149/36, 149/87
[51] Int. Cl. ................................. C06c 1/02
[58] Field of Search ................. 149/19, 20, 36, 87; 44/7

[56] References Cited
UNITED STATES PATENTS

| | | | |
|---|---|---|---|
| 3,657,028 | 4/1972 | Pannell | 149/36 X |
| 3,359,144 | 12/1967 | Atkins et al. | 149/36 |
| 3,116,187 | 12/1963 | Scanlon et al. | 149/36 X |
| 3,116,189 | 12/1963 | Fisher | 149/36 X |
| 3,164,505 | 1/1965 | Hsieh et al. | 149/36 |
| 3,196,059 | 7/1965 | Godfrey | 149/19 |
| 3,197,348 | 7/1965 | Skolnik et al. | 149/36 X |
| 3,232,801 | 2/1965 | Bost et al. | 149/19 |
| 3,343,931 | 9/1967 | Doyle | 149/36 |

*Primary Examiner*—Stephen J. Lechert, Jr.
*Attorney*—Edward O. Ansell, D. Gordon Angus and Donald W. Graves

[57] ABSTRACT

This patent describes novel gelled hydrazine-type fuels suitable for use in rockets, missiles and the like. The gelling agents are cross-linked polyacrylic acid polymers.

9 Claims, No Drawings

THIXOTROPIC HYDRAZINE FUEL GELLED WITH CROSS-LINKED POLYACRYLIC ACID

BACKGROUND OF THE INVENTION

The field of the present invention pertains to gelled rocket fuels.

For a variety of reasons it is very desirable to utilize hydrazine type fuels in liquid rockets in gelled form. Heretofore, various gelling agents have been proposed for use in hydrazine fuels. The principal advantages brought about by gelation of the hydrazine type fuels is reduction in the sloshing of fuel in the tank during flight which can cause the erratic behavior, and increases safety in handling since the consequences of spills and leaks are thereby substantially minimized.

The most satisfactory of the gelling agents utilized in the past for hydrazine-type fuels is linear polyacrylic acid, the use of which is described in greater detail in assignee's U.S. Pat. No. 3,232,801 issued Feb. 1, 1966. The present invention is principally concerned with a gelling agent which is an improvement over the use of linear polyacrylic acid.

SUMMARY OF THE INVENTION

Briefly, the present invention comprises a gelled, mechanically stable, thixotropic high-energy fuel composition comprising a hydrazine-type fuel containing an effective gelling amount of a gelling agent which is a cross-linked polyacrylic acid polymer.

The cross-linked polyacrylic acid polymer of this patent has several distinct advantages over the linear polyacrylic acid gelling agent described in the above-identified patent. First, the hydrazine gels prepared from cross-linked polyacrylic acid polymers do not adhere tenaciously to container walls, and secondly, an increase in the gelling agent concentration increases the low shear viscosity of the gel without a proportionate increase in the high shear viscosity. These properties make the gelled hydrazine fuels of the present invention more easily handled and more suitable for pumping and injecting in a liquid rocket motor. By the use of these fuels, significant improvements in the performance of liquid rocket motors can be accomplished.

Accordingly, it is the principal object of the present invention to provide a novel gelled hydrazine-type fuel composition.

More particularly, it is the object of the present invention to provide a novel gelled hydrazine-type fuel composition containing cross-linked polyacrylic acid.

Still more particularly, it is an object of the present invention to provide a gelled hydrazine-type fuel which does not adhere tenaciously to container walls and which increases the low shear viscosity of the gel as the gelling agent concentration is increased without a proportionate increase in the high shear viscosity.

These and other objects and advantages of the invention will be apparent from a more detailed description which follows:

DESCRIPTION OF THE PREFERRED EMBODIMENTS

In general, the cross-linked polyacrylic acid gelling agents of the present invention are prepared by reacting acrylic acid and a suitable polyfunctional cross-linking agent therefor in the presence of a polymerization initiator and an inert solvent. The resulting cross-linked polyacrylic acid polymer may be purified by removal of the solvent and drying. The final product is then dispersed in a hydrazine-type fuel and the gel forms. In general, the cross-linked polyacrylic acid gelling agent is utilized in an effective gelling amount, normally less than about 2 percent by weight. It is to be understood that more gelling agent can be utilized but this is not desirable since it reduces the overall energy potential of the rocket fuel.

The following examples are presented solely to illustrate the invention and should not be regarded as limiting in any way. In the examples, the parts and percentages are by weight unless otherwise indicated.

EXAMPLE 1

The following example illustrates the preparation of the gelling agent employed in the practice of the present invention. One part of divinylbenzene, 1.25 parts of azobis-(isobutyronitrile) initiator, 420 parts of acrylic acid, and 630 parts of benzene are mixed in weight amounts sufficient to give an overall weight of 40 grams of monomers. The reaction is maintained at 38°–40°C for 48–72 hours. The mixture is agitated continuously and the reactants are kept in an inert atmosphere. The product is then removed from the reaction flask, ground to a powder while wet, slurried in benzene, and then centrifuged for separation from the solvent. The recovered polymer is then triturated with 20-30 ml of benzene and centrifuged to remove the solvent. This cross-linked polyacrylic acid product is then dried at 45°–50°C at less than 0.5 torr for 48 hours. After this initial drying, the product is allowed to cure at ambient temperatures for an extended period in air on the order of about 2 weeks or more. At the end of this time, the product is dried for three days at about 90°–100°C in vacuum.

EXAMPLE 2

The dry product of Example 1 is added in an amount of about 0.7 percent by weight to neat hydrazine. There results quickly, the formation of a gel having a viscosity greater than 20 centipoise when sheared at a rate of 17,300 reciprocal seconds. The resultant gel does not adhere to vessel walls, but will support metal particles suspended in the gel.

The gelling capabilities of the cross-linked polyacrylic acids are shown in Table I hereof. Low values for the high shear viscosity indicate that the gel structure is not pronounced and that the solution behaves as a viscous liquid. Both products F and I form good gels with hydrazine. These gels are cohesive as evidenced by their non-adherence to glass; this is in sharp contrast to the behavior of linear polyacrylic acid.

TABLE I

PROPERTIES OF SOLUTIONS OF CROSS-LINKED POLYACRYLIC ACIDS

| Gelling Agent | Weight Ratio Divinyl-benzene Acrylic-Acid | High Shear Viscosity of Solutions Neutralized .3% in Water | 0.69% in hydrazine | Appearance of aqueous Solutions |
|---|---|---|---|---|
| Cross-linked Polyacrylic Acid: | | | | |
| A | 0.44 | 23.7 | 9.2 | clear, smooth |
| B | 1.20 | 22.4 | 10.3 | cloudy |

| | | | | |
|---|---|---|---|---|
| C | 0.043 | 12.9 | 5.7 | clear, lumpy |
| D | 0.093 | 19.3 | 7.9 | clear, lumpy |
| E | 0.073 | 12.9 | 4.5 | clear, smooth |
| F | 0.24 | 57.5 | 22.4 | clear, smooth |
| G | 0.083 | 21.7 | 6.7 | clear, smooth |
| H | 0.15 | 11.8 | 8.7 | clear, smooth |
| I | 0.24 | 22.9 | 17.1 | clear, smooth |

The cross-linked polyacrylic acids of this invention were compared with linear polyacrylic acid with respect to the upper temperature limit of the gel structure in hydrazine and sensitivity to extraneous ions. Sodium nitrate, which is easy to handle and relatively soluble in hydrazine, was used to introduce known concentrations of ions in hydrazine. High shear viscosity measurements were used to obtain quantitative results concerning the effect of salt addition.

Samples of hydrazine gelled with cross-linked polyacrylic acid F were heated to determine the temperatures at which the transition from gel to viscous liquid occurs; for the cross-linked polyacrylic acid gel this temperature is 48°C, compared to 46°C for a linear polyacrylic acid gel.

Both of these gels were then examined with respect to their sensitivity to extraneous ions. The data are presented in Table II herewith and polyacrylic acid is included for comparison purposes.

TABLE II

EFFECT OF SODIUM NITRATE CONCENTRATION ON THE HIGH SHEAR VISCOSITY OF HYDRAZINE GELLED WITH MODIFIED POLYACRYLIC ACIDS

| | Cross-linked Polyacrylic Acid F 0.69% in hydrazine 0.65% in hydrazine solutions | | Polyacrylic Acid 0.69% in hydrazine 0.65% in hydrazine solutions | |
|---|---|---|---|---|
| Gellant Concentration Sodium Nitrate (ppm) | Viscosity (cp) | | Sodium Nitrate (ppm) | Viscosity (cp) |
| 0 | 23.6 ± 2.0 | | 0 | 30 |
| 42 | 17.5 ± 1.5 | | 52 | 24.5 |
| 79 | 15.6 ± 1.8 | | 80 | 19.5 |
| 171 | 9.3 ± 1.1 | | 199 | 10.6 |
| 256 | 7.9 ± 0.3 | | | |

The cross-linking agent utilized in the preparation of the gelling agent of the present invention is normally a material containing at least two ethylenically unsaturated groups capable of polymerization with the vinyl group in the acrylic acid.

The cross-linking agents are generally conjugated dienes, such as 1,3-butadiene and isoprene. When other dienes are used to replace divinyl-benzene, a mole ratio of about $1.5 \times 10^{-3}$ of diene to acrylic acid replaces the weight ratio.

It has been found that best results with the cross-linked polyacrylic acid gelling agents are obtained as indicated below.

The solvent-monomer ratio and type of solvent used in the polymerization are important in achieving an optimum gelling capacity of the polymer. The effect of the ratio of solvent to monomer is shown below by comparison of the high shear viscosity of a water solution containing 1.0 wt percent neutralized gelling agent.

TABLE III

| Polymer No. | Wt % Acrylic Acid | Wt % of Solvent (Benzene) | High Shear Viscosity | Solvent-Monomer Ratio |
|---|---|---|---|---|
| 1 | 51.5 | 48.3 | 23.4 | 0.94 |
| 2 | 39.8 | 60 | 39.4 | 1.5 |

Polymerization of polymers 1 and 2 was initiated by 0.1 to 0.12 wt percent azobis-(isobutyronitrile) and cross-linked with 0.50–0.60 wt percent divinylbenzene in benzene at 35°–40°C for 72 hours. The foregoing data show that for optimum gelling capacity, the weight ratio of solvent to acrylic acid should be at least 1 to 1, and preferably an excess of solvent. In general, any organic solvent for acrylic acid such as benzene and dioxane may be used. The effect of the nature of the solvent on gelling capacity of the polymer is shown by the following data, measuring the high shear viscosity of a 1 wt percent neutralized polymer in water. Polymers 3 and 4 were initiated by 0.1 wt percent benzoylperoxide in the respective solvents at 30°–45°C for 72 hours.

TABLE IV

| Polymer No. | Wt % Acrylic Acid | Solvent | Wt % Solvent | High Shear Viscosity |
|---|---|---|---|---|
| 3 | 34.7 | Benzene | 65.2 | 40.4 |
| 4 | 24.0 | Dioxane | 74.9 | 11.0 |

The degree of cross-linking is a critical parameter and is demonstrated by comparison of the high shear viscosity in Table I for polymers containing different weight ratios of divinylbenzene and acrylic acid. The optimum ratio is 0.24 weight percent for the highest high shear viscosity.

Temperature control during polymerization of acrylic acid initiated by benzoyl peroxide in benzene was found to effect the gelling properties. The high shear viscosity of a 1.0 wt percent polymer in water was 13.6 cp when the polymerization was carried out at 80°C for 72 hours and it was 40 cp when polymerization was carried out at 80°C for 72 hours and it was 40 cp when polymerization was carried out at 43°–45°C for 72 hours. The temperature range is not critical but the temperature generally should not exceed about 45°C.

The polyacrylic acid gelling agents A through G, Table I, were originally isolated and dried at 45°–50°C at less than 0.5 torr for 48 hours. The gelling capability of each agent was evaluated by measuring the high shear viscosity of a water solution containing 0.3 wt percent neutralized agent. The agents were air cured for at least 2 weeks and dried for 3 days at 90°–100°C in vacuum as described in Example 1. The high shear viscosity was measured. The results of the drying procedure are shown in the following table:

TABLE V

| Gelling Agent | High Shear Viscosity, cp 0.3 wt % in water solution | |
|---|---|---|
| | Initial drying | Final drying |
| A | 11.4 | 23.7 |
| B | 9.0 | 22.4 |
| C | 6.1 | 12.9 |
| D | 7.0 | 19.3 |
| E | 6.2 | 12.9 |
| F | 13.7 | 57.5 |
| G | 5.5 | 21.7 |

These data indicate that ordinary polyacrylic acid and cross-linked polyacrylic acid are comparable in behavior with respect to temperature and in sensitivity to extraneous ions. The cross-linked material exhibits improvement with respect to adhesiveness of the resultant gels.

There may be included in the gelled hydrazine-type fuels of the present invention as an optional ingredient, powdered metal such as aluminum or beryllium. These metals serve to increase the specific impulse of the fuel. The amount of powdered metal employed is not critical. Normally, if a powdered metal is added, it is used in amounts up to about 60 percent by weight based on the total weight of the gelled fuel composition. When these metals are incorporated in the gelled hydrazine compositions of this invention, it has been found that the resulting fuel is mechanically stable and that there is no tendency for the powdered metal to settle out of the gel.

While the invention has been specifically illustrated using essentially pure hydrazine as a liquid fuel, it is to be understood that the present invention is applicable to all types of hydrazine-type fuels, including monomethyl hydrazine and unsymmetrical dimethyl hydrazine.

As can be seen from the examples, stable hydrazine gels are produced by mixing a gelling agent and optionally, powdered metal, with a hydrazine-type fuel. The blending of the ingredients is simply accomplished normally by shaking or mechanical agitation, to distribute the gelling agent and to disperse the powdered metal. The gelled fuel compositions of this invention are highly energetic and are directly useful as fuels in liquid rocket motors. The compositions of the present invention are readily distinguishable from those heretofore known in that they have little or no tendency to adhere to container and transporting pipe walls. This is a significant advance in the art and greatly facilitates the handling of gelled hydrazine-type fuels. Therefore, the composition of the present invention will find immediate application in the defense and space effort.

Having fully described the invention, it is intended that it be limited only by the lawful scope of the appended claims.

We claim:

1. A gelled, mechanically stable thixotropic high-energy, fuel composition comprising a hydrazine fuel containing therein an effective gelling amount of a gelling agent comprising cross-linked polyacrylic acid.

2. The composition of claim 1 wherein the gelling agent comprises polyacrylic acid cross-linked with a conjugated diene.

3. The composition of claim 1 wherein the gelling agent comprises polyacrylic acid cross-linked with divinyl benzene.

4. The composition of claim 1 wherein there is additionally present in an amount up to about 60% by weight of a powdered metal fuel.

5. The composition of claim 1 wherein the hydrazine fuel is neat hydrazine.

6. The composition of claim 3 wherein the divinyl benzene is present in the gelling agent in an amount equal to about 0.24 weight per cent.

7. The composition of claim 1 wherein the gelling agent comprises polyacrylic acid cross-linked with 1,3-butadiene.

8. The composition of claim 1 wherein the gelling agent is prepared in a solvent solution wherein the weight ratio of acrylic acid to solvent is at least 1 to 1.

9. The composition of claim 1 wherein the gelling agent is prepared at a temperature of about 45°C.

* * * * *